United States Patent
Kobayashi et al.

(10) Patent No.: US 8,392,076 B2
(45) Date of Patent: Mar. 5, 2013

(54) CONTROL DEVICE OF VEHICULAR AUTOMATIC TRANSMISSION

(75) Inventors: Nobufusa Kobayashi, Anjo (JP); Yoshio Hasegawa, Chiryu (JP); Naoto Komeno, Toyota (JP); Norihiro Tsukamoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 572 days.

(21) Appl. No.: 12/652,782

(22) Filed: Jan. 6, 2010

(65) Prior Publication Data

US 2010/0204892 A1    Aug. 12, 2010

(30) Foreign Application Priority Data

Feb. 12, 2009  (JP) ................................ 2009-030204

(51) Int. Cl.
*G06F 7/00* (2006.01)
*F16H 61/00* (2006.01)

(52) U.S. Cl. ............ 701/51; 701/67; 477/155; 477/123; 477/125; 477/130; 477/143; 477/154; 477/169; 477/906; 74/335; 74/513; 192/3.31; 192/3.58; 192/21.5; 192/103 R; 439/76.1; 439/660

(58) Field of Classification Search ............... 701/51, 701/67; 477/87, 123–125, 130, 143, 154–155, 477/169–176, 906; 74/335, 513; 192/3.31, 192/3.58, 21.5, 103 R See application file for complete search history.

(56) References Cited

U.S. PATENT DOCUMENTS

| | | | |
|---|---|---|---|
| 5,010,990 A | * | 4/1991 | Yoshimura et al. ............ 192/3.3 |
| 5,329,830 A | * | 7/1994 | Kitagawa et al. ............. 477/117 |
| 5,558,599 A | * | 9/1996 | Tsukamoto et al. .......... 477/116 |
| 5,679,095 A | * | 10/1997 | Sekine et al. ................. 477/116 |
| 5,690,581 A | * | 11/1997 | Nadayoshi et al. ........... 477/176 |
| 5,707,316 A | * | 1/1998 | Tanahashi et al. ............. 477/116 |
| 5,911,646 A | * | 6/1999 | Tsutsui et al. .................. 477/93 |

(Continued)

FOREIGN PATENT DOCUMENTS

| | | |
|---|---|---|
| JP | 11063212 A | 3/1999 |
| JP | 11230327 A | 8/1999 |
| JP | 2000304127 A | 11/2000 |
| JP | 2000304128 A | 11/2000 |
| JP | 2004190756 A | 7/2004 |

OTHER PUBLICATIONS

Japanese Office Action issued on May 10, 2011 in corresponding Japanese Application No. JP 2009-030204 and partial English language translation of the Office Action (4 pages).

*Primary Examiner* — James Trammell
*Assistant Examiner* — Majdi Alsomiri
(74) *Attorney, Agent, or Firm* — Gifford, Krass, Sprinkle, Anderson & Citkowski, P.C.

(57) ABSTRACT

In a control of a vehicular automatic transmission, an engaging device provided in a power transmission path between an engine and driving wheels is brought into a slipping state or a release state when a certain neutral control condition is satisfied while a shift lever is placed in a running position, the engaging device is engaged so as to increase a torque transmission capacity thereof when a certain neutral control cancellation condition is satisfied during neutral control under which the engaging device is in the slipping state or the release state, and an engaging pressure of the engaging device is held at a constant pressure level for a given period of time when an accelerator pedal is depressed while the engaging device is engaged so as to increase the torque transmission capacity thereof.

19 Claims, 7 Drawing Sheets

U.S. PATENT DOCUMENTS

| | | |
|---|---|---|
| 5,957,808 A | 9/1999 | Iizuka |
| 6,843,754 B2 * | 1/2005 | Mori et al. ...................... 477/92 |
| 7,328,094 B2 * | 2/2008 | Nagai et al. ..................... 701/51 |
| 2004/0111204 A1 | 6/2004 | Kojima et al. |
| 2004/0229728 A1 * | 11/2004 | Oshima et al. ................. 477/176 |
| 2008/0076633 A1 * | 3/2008 | Nagai et al. .................... 477/117 |
| 2008/0172161 A1 * | 7/2008 | Kondo et al. ................... 701/66 |

* cited by examiner

|       | C1 | C2 | B1 | B2 | B3 | F1 |
|-------|----|----|----|----|----|----|
| 1ST   | ○  |    |    | ◎  |    | △  |
| 2ND   | ○  |    | ○  |    |    |    |
| 3RD   | ○  |    |    |    | ○  |    |
| 4TH   | ○  | ○  |    |    |    |    |
| 5TH   |    | ○  |    |    | ○  |    |
| 6TH   |    | ○  | ○  |    |    |    |
| R     |    |    |    | ○  | ○  |    |
| N     |    |    |    |    |    |    |

◎ ENGAGED WHEN ENGINE BRAKE IS APPLIED
△ ENGAGED ONLY DURING DRIVING

| ACCELERATOR PEDAL TRAVEL | 5 | 10 | 15 | ... |
|---|---|---|---|---|
| OIL PRESSURE CORRECTION AMOUNT | 100 | 115 | 150 | ... |

CONTROL DEVICE OF VEHICULAR AUTOMATIC TRANSMISSION

INCORPORATION BY REFERENCE

The disclosure of Japanese Patent Application No. 2009-030204 filed on Feb. 12, 2009 including the specification, drawings and abstract is incorporated herein by reference in its entirety.

BACKGROUND OF THE INVENTION

1. Field of the Invention

The invention relates to a control device of a vehicular automatic transmission, and in particular to control executed when neutral control is cancelled.

2. Description of the Related Art

A vehicular automatic transmission is known which is operable under neutral control when certain neutral control conditions, for example, that a foot brake (brake pedal) is in the ON position and the vehicle speed is equal to zero, are satisfied while the shift lever is in one of running positions, such as D range. Under the neutral control, an engaging device provided in a power transmission path between an engine and driving wheels is caused to slip or is released when the neutral conditions are satisfied, so as to restrict power transmission through the power transmission path, thereby to reduce the idling load of the engine.

One example of control device for the above type of automatic transmission is described in Japanese Patent Application Publication No. 2000-304127 (JP-A-2000-304127). According to the technology disclosed in JP-A-2000-304127, when the accelerator pedal is operated (e.g., depressed) during cancellation of the neutral control, a target rate of change of a turbine speed is corrected to increase, so that an engaging device to be engaged upon cancellation of the neutral control is brought into an engaged state before racing of the engine takes place.

The technology for reducing shock by rapidly engaging the engaging device through correction of the oil pressure applied thereto during cancellation of the neutral control, as described in JP-A-2000-304127, is also described in, for example, Japanese Patent Application Publication No. 2000-304128 (JP-A-2000-304128) and Japanese Patent Application Publication No. 11-230327 (JP-A-11-230327). In any of the control methods described in the above-identified publications, the oil pressure applied to the engaging device is corrected uniformly or in the same manner irrespective of variations in the time at which the accelerator pedal is operated during cancellation of the neutral control; therefore, it is difficult to reduce shock with stability. Namely, during cancellation of the neutral control, an engaged state of the engaging device to be engaged and a shift stage in the process of shifting the automatic transmission naturally vary depending on a point in time at which the accelerator pedal is operated. However, according to the control methods as described in JP-A-2000-304127, JP-A-2000-304128 and JP-A-11-230327, the oil pressure is corrected uniformly or in the same manner without taking account of the above-mentioned variations; therefore shock may occur during cancellation of the neutral control, depending on the timing of operation of the accelerator pedal.

SUMMARY OF THE INVENTION

The invention provides a control device of a vehicular automatic transmission which can perform neutral control by bringing an engaging device provided in a power transmission path from the engine to driving wheels into a slipping state or a release state so as to reduce an idling load of the engine, and which can stably reduce shock when the accelerator pedal is operated during cancellation of the neutral control, irrespective of the timing of the operation of the accelerator pedal.

A first aspect of the invention relates to a control device of a vehicular automatic transmission. The control device includes a neutral control unit that brings an engaging device provided in a power transmission path between an engine and driving wheels into a slipping state or a release state when a certain neutral control condition is satisfied while a shift lever is placed in a running position, so as to restrict power transmission through the power transmission path and reduce an idling load of the engine, a neutral-control cancellation control unit that engages the engaging device so as to increase a torque transmission capacity thereof when a certain neutral control cancellation condition is satisfied during neutral control under which the engaging device is in the slipping state or the release state, and an oil pressure holding unit that holds an engaging pressure of the engaging device at a constant pressure level for a given period of time, when an accelerator pedal is depressed while the engaging device is engaged so as to increase the torque transmission capacity thereof.

With the control device thus constructed, when the accelerator pedal is depressed during cancellation of neutral control, namely, during increase of the torque transmission capacity of the engaging device, the engaging pressure applied to the engaging device is held at a constant pressure level for a given period of time, so that the engaged state of the engaging device and the shift stage in the process of shifting the automatic transmission can be made constant or consistent irrespective of the timing of depression of the accelerator pedal. Accordingly, subsequent hydraulic control of the engaging device can be performed based on substantially the same or similar engaged state and shift stage, irrespective of the timing of depression of the accelerator pedal, thus assuring improved stability in control and stable reduction of shock that would occur upon cancellation of the neutral control.

The control device according to the first aspect of the invention may further include a driving force storing unit that stores a driver-requested driving force corresponding to an amount of depression of the accelerator pedal detected upon and after start of depression of the accelerator pedal, and a driving force retrieving unit that retrieves the driver-requested driving force stored in the driving force storing unit so that the retrieved driving force is generated after the engaging pressure of the engaging device is held at the constant pressure level by the oil pressure holding unit.

With the control device thus constructed, the driver-requested driving force determined based on the amount of depression of the accelerator pedal upon and after start of the depression of the accelerator pedal is stored, and the requested driving force stored in the driving force storing unit is retrieved after the engaging pressure of the engaging device is held at the constant pressure level by the oil pressure holding unit. Thus, the same driving force as the driver-requested driving force is generated to the driving wheels after the engaging pressure is held at the constant level for the given period of time. Accordingly, the actual driving force is prevented from deviating from the driving force intended by the driver, and the driver will not feel uncomfortable about such deviation of the driving force.

In the control device according to the first aspect of the invention, the given period of time for which the engaging pressure of the engaging device is held at the constant pressure level may be a period from a point in time at which depression of the accelerator pedal is started to a point in time at which a turbine racing speed becomes equal to a predetermined value.

In the control device as described above, the given period of time for which the engaging pressure is held constant is a period of time from the time when depression of the accelerator pedal is started, to the time when the turbine racing speed becomes equal to the predetermined value. Thus, the start and end points of the given period of time for which the engaging pressure is held constant can be easily determined. Also, the time at which the engaged state of the engaging device and the shift stage of the automatic transmission reach preset or predetermined ones can be determined based on the turbine racing speed.

In the control device according to the first aspect of the invention, the constant pressure level of the engaging device may be an oil pressure reached at the time of depression of the accelerator pedal.

In the control device as described above, the constant pressure level at which the engaging pressure of the engaging device is held is equal to an oil pressure level reached when the accelerator pedal is depressed. Therefore, the engaging pressure is held constant at the oil pressure reached at that time. With the engaging pressure thus controlled, the engagement of the engaging device proceeds, so that the engaging device can be brought into a preset or predetermined engaged state.

The control device may further include an engaging pressure increasing unit that increases the engaging pressure of the engaging device as an accelerator pedal travel increases, after the engaging pressure of the engaging device is held at the constant pressure level.

With the control device thus constructed, the engaging pressure of the engaging device increases as the accelerator pedal travel increases; therefore, the oil pressure commensurate with the driver-requested driving force is appropriately generated.

A second aspect of the invention relates to a control method of a vehicular automatic transmission. The control method includes the steps of: bringing an engaging device provided in a power transmission path between an engine and driving wheels into a slipping state or a release state when a certain neutral control condition is satisfied while a shift lever is placed in a running position, engaging the engaging device so as to increase a torque transmission capacity thereof when a certain neutral control cancellation condition is satisfied during neutral control under which the engaging device is in the slipping state or the release state, and holding an engaging pressure of the engaging device at a constant pressure level for a given period of time, when an accelerator pedal is depressed while the engaging device is engaged so as to increase the torque transmission capacity thereof.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

One embodiment of the invention will be described in detail with reference to the drawings. It is to be understood that the structure of the following embodiment shown in the drawings may be simplified or modified as needed, and the dimensional ratios and shapes, for example, of its components or portions depicted in the drawings are not necessarily accurate.

Figure 1:
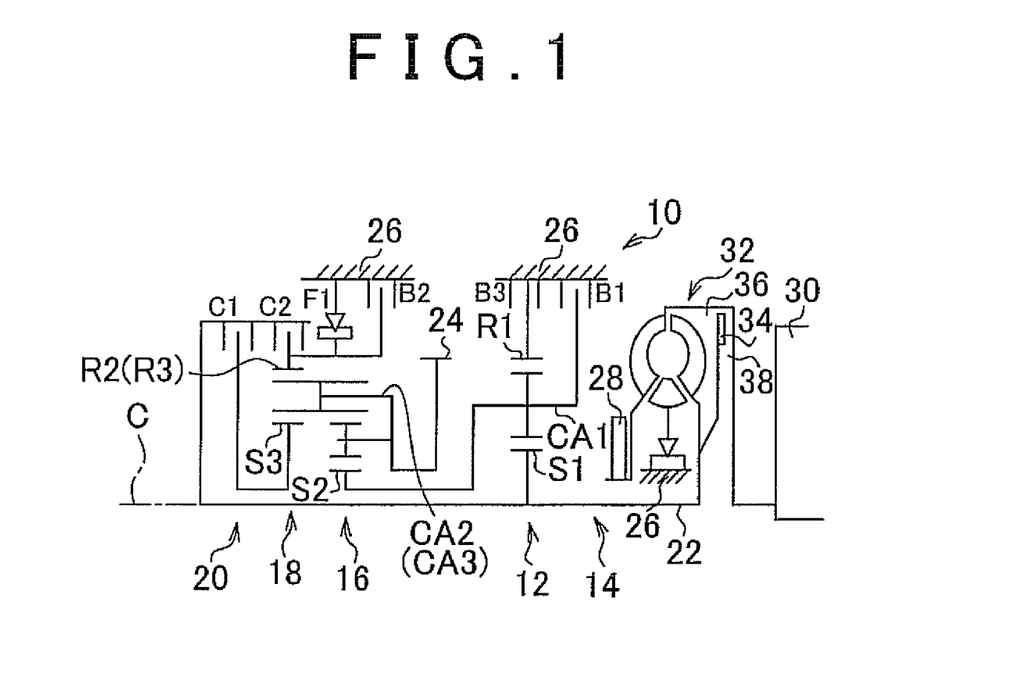
FIG. 1 is a skeleton diagram of a vehicular automatic transmission as a part of a vehicular power transmitting system, which is controlled by a control device according to one embodiment of the invention.
Figure 3:
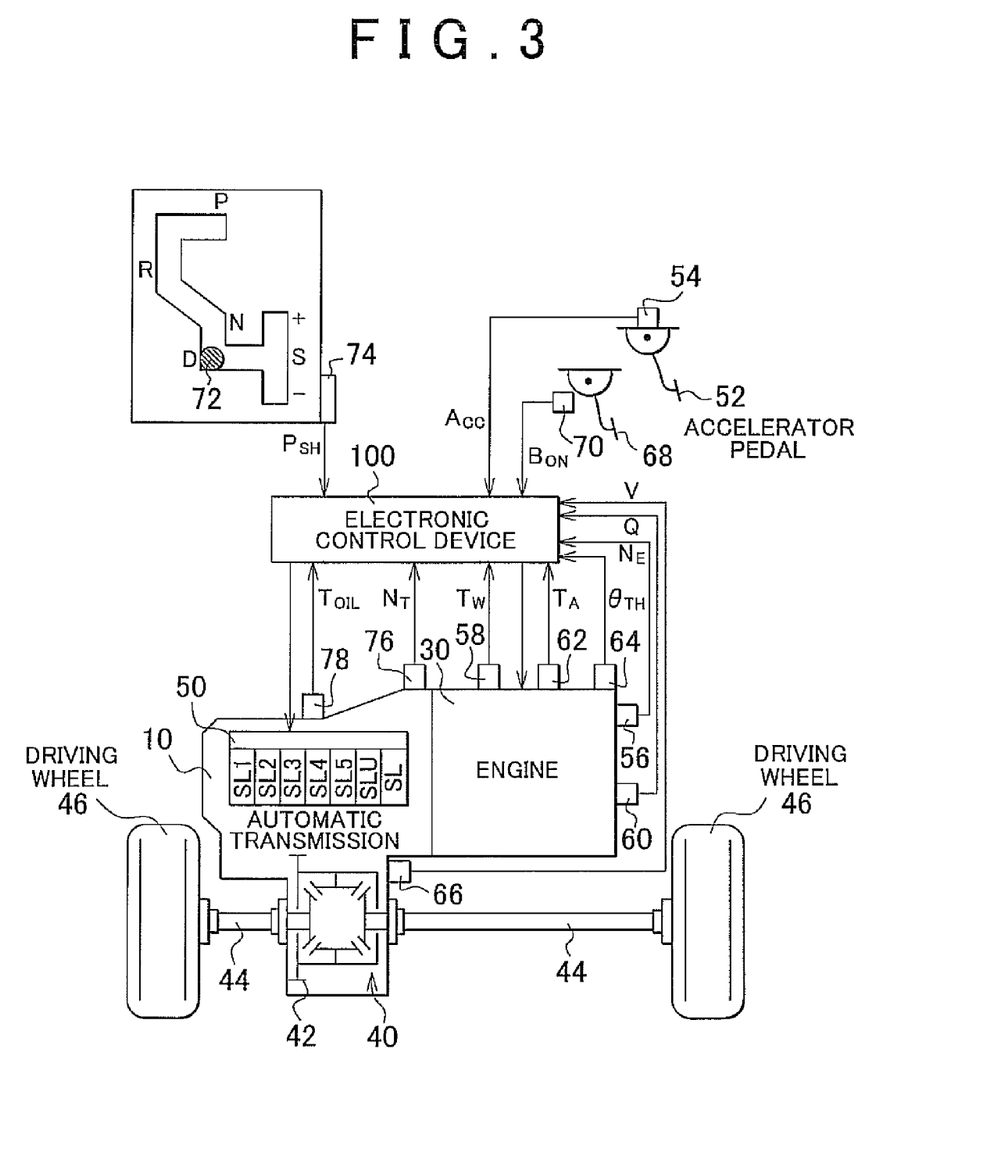
FIG. 3 is a block diagram illustrating the general construction of a principal part of a control system provided in the vehicle for controlling the automatic transmission of FIG. 1, etc. and a power transmitting system from the engine to driving wheels.

FIG. 1 is a skeleton diagram of a vehicular automatic transmission 10 (which will be simply called "automatic transmission 10") as a part of a vehicular power transmitting system to which the present invention is applied. The automatic transmission 10 is favorably used in an FF vehicle in which the transmission 10 is installed in the lateral direction (or transversely) of the vehicle. The automatic transmission 10 has a first speed change portion 14 that consists principally of a single-pinion type first planetary gear set 12, and a second speed change portion 20 in the form of a Ravigneaux gear train that consists principally of a double-pinion type second planetary gear set 16 and a single-pinion type third planetary gear set 18. In a transmission case 26 as a non-rotary member mounted on the vehicle body, the first speed change portion 14 and the second speed change portion 20 are disposed on a common axis C, and are operable to change the speed of rotation of an input shaft 22, to produce an output from an output rotary member 24. In this embodiment, the input shaft 22, which corresponds to an input member of the automatic transmission 10, is a turbine shaft of a torque converter 32 as a hydraulic power transmission device that is driven and rotated by an engine 30 as a source of power for running the vehicle. The output rotary member 24, which corresponds to an output member of the automatic transmission 10, serves as an output gear, or a differential drive gear, which meshes with a differential driven gear (large-diameter gear) 42 so as to transmit power to a differential gear device 40 as shown in FIG. 3. The power of the engine 30 is transmitted to a pair of driving wheels 46 via the torque converter 32, automatic transmission 10, differential gear device 40, and a pair of axles 44, as shown in FIG. 3. It is to be noted that the automatic transmission 10 and the torque converter 32 are constructed generally symmetrically with respect to the center line (axis) C, and the lower halves of the automatic transmission 10 and torque converter 32 below the center line C are not illustrated in the skeleton diagram of FIG. 1.

The torque converter 32 includes a lock-up clutch 34 as a lock-up mechanism that transmits power of the engine 30 directly to the input shaft 22 without involving fluid. The lock-up clutch 34 is a hydraulic friction clutch that is engaged by friction depending on a pressure difference $\Delta P$ between an oil pressure in an apply-side oil chamber 36 and an oil pressure in a release-side oil chamber 38. When the lock-up clutch 34 is fully engaged (i.e., when the lock-up clutch 34 is ON), the power of the engine 30 is transmitted directly to the input shaft 22. When the pressure difference $\Delta P$, or torque capacity, is controlled in a feedback fashion so as to engage the lock-up clutch 34 in a certain slipping condition, the turbine shaft (input shaft 22) is rotated following rotation of an output rotary member of the engine 30, with a certain slip amount of about 50 rpm, for example, during driving (power-on) of the vehicle. During non-driving (power-off) of the vehicle, on the other hand, the output rotary member of the engine 30 is rotated following rotation of the turbine shaft, with a certain slip amount of about −50 rpm, for example. In this connection, the slip amount is a value obtained by subtracting the rotational speed of the turbine shaft (i.e., input shaft 22) from the rotational speed of the output rotary member of the engine 30.

Figure 2:
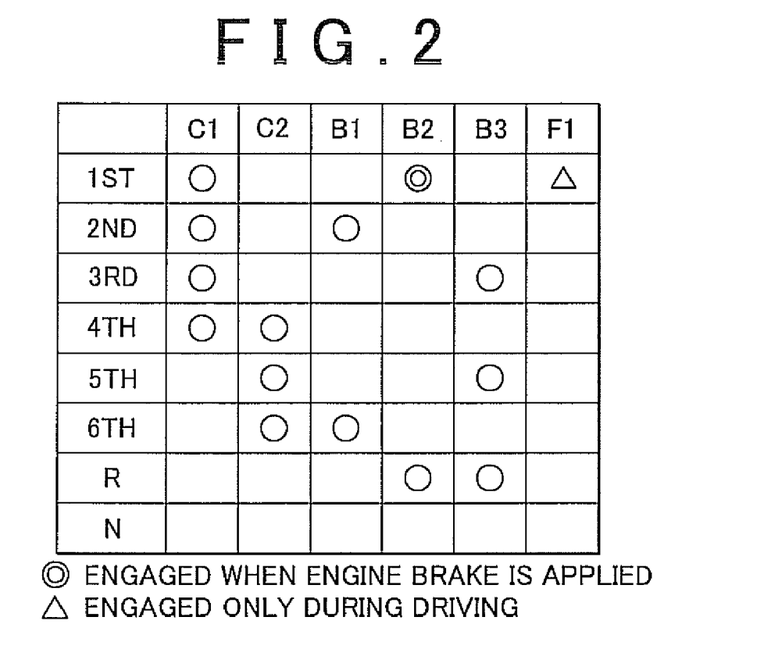
FIG. 2 is an operation table explaining the operating states of friction elements or friction devices when each of a plurality of gear positions is established in the automatic transmission of FIG. 1.

The automatic transmission 10 is placed in a selected one of six forward-drive gear positions, i.e., the first-speed gear position "1st" to the sixth-speed gear position "6th", and a reverse-drive gear position "R", according to a combination of coupling states among selected ones of rotational elements (i.e., sun gears S1-S3, carriers CA1-CA3, and ring gears R1-R3) of the first speed change portion 14 and second speed change portion 20. Of the forward-drive gear positions, for example, the first-speed gear position is established when a clutch C1 is engaged, or the clutch C1 and a brake B2 are engaged, and the second-speed gear position is established when the clutch C1 and a brake B1 are engaged, while the third-speed gear position is established when the clutch C1 and a brake B3 are engaged, and the fourth-speed gear position is established when the clutch C1 and a clutch C2 are engaged, as shown in FIG. 2. Also, the fifth-speed gear position is established when the clutch C2 and the brake B3 are engaged, and the sixth-speed gear position is established when the clutch C2 and the brake B1 are engaged. The reverse-drive gear position is established when the brake B2 and the brake B3 are engaged, and the automatic transmission 10 is placed in a neutral condition when all of the clutches C1, C2 and the brakes B1-B3 are released.

The operation table of FIG. 2 shows the relationship between each of the above-indicated gear positions and the operating states of the clutches C1, C2 and brakes B1-B3. In FIG. 2, circle represents engagement, and double circle represents engagement only when an engine brake is applied. In this embodiment, in particular, a one-way clutch F1 is provided in parallel with the brake B2. With this arrangement, only the clutch C1 is engaged so as to establish the first-speed gear position when the vehicle is started (or accelerated), and the clutch C1 and the brake B2 are engaged when an engine brake is to be applied. Thus, so-called neutral control for reducing an idling load of the engine 30 can be carried out by bringing the clutch C1 into a slipping state or a release state when the vehicle is at rest with the automatic transmission 10 placed in the first-speed gear position. The speed ratios of the respective speeds or gear positions are suitably determined according to respective gear ratios (=the number of teeth of the sun gear/the number of teeth of the ring gear) $\rho 1$, $\rho 2$, $\rho 3$ of the first planetary gear set 12, second planetary gear set 16 and the third planetary gear set 18.

The clutches C1, C2 and brakes B1-B3 (which will be simply called "clutch C" or "brake B" when not particularly distinguished from one another) are hydraulic friction devices or elements, such as multiple-plate clutches or multiple-disc type brakes, which are engaged under control by hydraulic actuators. In operation, an appropriate one or ones of linear solenoid valves SL1-SL5 of a hydraulic control circuit 50 (see FIG. 3) is/are energized, deenergized, or subjected to current control, so as to switch a corresponding one(s) of the hydraulic friction devices (clutches C and brakes B) between an engaged state and a release state, and control a hydraulic pressure applied to each friction device during a transition between the engaged and release states.

In FIG. 3, an electronic control device 100 includes a so-called microcomputer having, for example, CPU, RAM, ROM, input/output interface, etc. The CPU performs signal processing according to programs stored in advance in the ROM, utilizing the temporary storage function of the RAM, so as to implement output control of the engine 30, shift control of the automatic transmission 10, ON/OFF control of the lock-up clutch 34, and so forth. The electronic control device 100 is divided as needed into a unit for engine control, a unit for shift control for controlling the linear solenoid valves SL1-SL5, a unit for lock-up clutch control for controlling a linear solenoid valve SLU and a solenoid valve SL of the hydraulic control circuit 50, and so forth.

For example, the electronic control device 100 receives an accelerator pedal travel signal indicative of an accelerator pedal travel Acc as the amount of depression of the accelerator pedal 52, which is detected by an accelerator pedal position sensor 54, a signal indicative of the engine speed $N_E$ as the speed of revolution of the engine 30 detected by an engine speed sensor 56, a signal indicative of the coolant temperature $T_W$ of the engine 30 detected by a coolant temperature sensor 58, a signal indicative of the intake air quantity Q of the engine 30 detected by an intake air quantity sensor or air flow meter 60, and a signal indicative of the temperature $T_A$ of the intake air detected by an intake air temperature sensor 62. The electronic control device 100 also receives a throttle opening signal indicative of the opening $\theta_{TH}$ of an electronic throttle valve which is detected by a throttle position sensor 64, a vehicle speed signal corresponding to the rotational speed $N_{OUT}$ of the output rotary member 24, or the vehicle speed V, which is detected by a vehicle speed sensor 66, a signal indicative of an operation (ON) $B_{ON}$ of a foot brake pedal 68, which signal indicates that the foot brake pedal as a service brake is being operated (i.e., depressed), as detected by a brake switch 70, a signal indicative of the lever position $P_{SH}$ of a shift lever 72 (i.e., the position to which the shift lever 72 is operated, or shift position), which is detected by a lever position sensor 74, a signal indicative of the turbine speed $N_T$ (=rotational speed $N_{IN}$ of the input shaft 22) detected by a turbine speed sensor 76, and a signal indicative of the AT oil temperature $T_{OIL}$ as a temperature of hydraulic oil in the hydraulic control circuit 50, which is detected by an AT oil temperature sensor 78.

Also, the electronic control device 100 generates a drive signal to a throttle actuator for controlling the opening $\theta_{TH}$ of the electronic throttle valve, an ignition signal as a command of the ignition timing of the engine 30, a fuel supply amount signal for controlling the amount of fuel supplied to the engine 30 by a fuel injection device that supplies fuel into the intake pipe or each cylinder of the engine 30 or stops supplying the fuel, a lever position $P_{SH}$ indication signal for operating a shift indicator, signals for controlling shift solenoids that drive shift valves in the hydraulic control circuit 50 so as to change the gear position of the automatic transmission 10, a command signal for driving a linear solenoid valve that controls the line pressure, a command signal for driving a linear solenoid valve that engages or releases the lock-up clutch 34 or controls the slip amount of the lock-up clutch 34, and so forth.

The shift lever 72 is mounted in the vicinity of the driver's seat, for example, and is configured to be manually operated to a selected one of five positions "P", "R", "N", "D" and "S", as shown in FIG. 3.

The "P" position (or P range) is a parking position for establishing a neutral condition in which the power transmission path in the automatic transmission 10 is disconnected, namely, power transmission in the automatic transmission 10 is cut off or interrupted, and mechanically inhibiting (locking) rotation of the output rotary member 24 by a mechanical parking mechanism. The "R" position is a reverse-drive running position for rotating the output rotary member 24 of the automatic transmission 10 in the reverse direction, and the "N" position is a neutral position for establishing a neutral condition in which the power transmission in the automatic transmission 10 is cut off or interrupted. The "D" position is a forward-drive running position in which automatic shift control is performed, using all of the forward-drive gear positions, i.e., the first-speed gear position "1st" through the sixth-speed gear position "6th", over a shift range (i.e., D range) within which the automatic transmission 10 is allowed to be shifted. The "S" position is a forward-drive running position in which the automatic transmission 10 can be manually shifted by allowing the driver to select one of a plurality of shift ranges each limiting the range of change of gear positions, namely, to select one of a plurality of shift ranges having different high-speed gear positions.

The "S" position is provided with a "+" position as a lever position $P_{SH}$ for shifting the shift range to the UP side each time the shift lever 72 is operated to the "+" position, and a "−" position as a lever position $P_{SH}$ for shifting the shift range to the DOWN side each time the shift lever 72 is operated to the "−" position. For example, the above-indicated plurality of shift ranges consist of "6" range in which one of the first-speed gear position to the sixth-speed gear position is selected, "5" range in which one of the first-speed to fifth-speed gear positions is selected, "4" range in which one of the first-speed to fourth-speed gear positions is selected, "3" range in which one of the first-speed to third-speed gear positions is selected, "2" range in which the first-speed or second-speed gear position is selected, and "L" range in which the first-speed gear position is established. When the shift lever 72 is in the "S" position, one of the "6" range through the "L" range is selected according to an operation of the shift lever 72 to the "+" position or "−" position. The "L" range in the "S" position also serves as an engine-brake range in which the automatic transmission 10 is placed in the first-speed gear position "1st" with the brake B2 engaged, so as to provide an increased engine-brake effect.

The "D" position is a lever position for selecting an automatic shift mode as a control mode in which automatic shift control is performed over a range of the first-speed gear position through the sixth-speed gear position, as shown in FIG. 2 by way of example, over which the automatic transmission 10 is allowed to be shifted. The "S" position is a lever position for selecting a manual shift mode as a control mode in which automatic shift control is performed within a selected one of the shift ranges such that the gear ratio is not reduced to be smaller than that of the highest-speed gear position in the selected shift range, and in which manual shift control is performed based on the shift range (i.e., the highest-speed gear position) that is changed by a manual operation of the shift lever 72 to the "+" position or "−" position.

Figure 4:
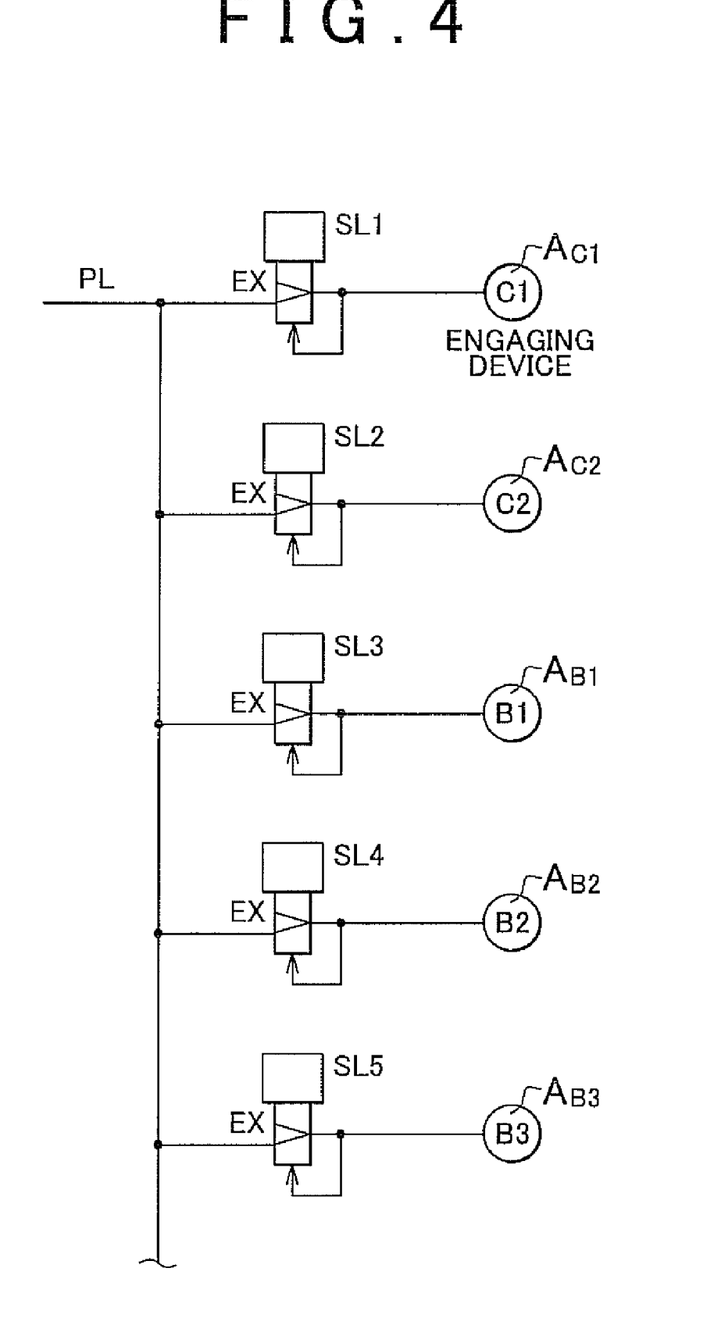
FIG. 4 is a circuit diagram concerning linear solenoid valves that control the operations of respective hydraulic actuators (hydraulic cylinders) of clutches and brakes in the hydraulic control circuit of FIG. 3.

FIG. 4 is a circuit diagram concerning the linear solenoid valves SL1-SL5 that control the operations of respective hydraulic actuators (hydraulic cylinders in this embodiment) $A_{C1}$, $A_{C2}$, $A_{B1}$, $A_{B2}$, $A_{B3}$ of the clutches C1, C2 and brakes B1-B3 in the hydraulic control circuit 50.

In FIG. 4, the line pressure PL is regulated into engaging pressures $P_{C1}$, $P_{C2}$, $P_{B1}$, $P_{B2}$, $P_{B3}$ by the respective linear solenoid valves SL1-SL5, according to command signals from the electronic control device 100, and the engaging pressures $P_{C1}$, $P_{C2}$, $P_{B1}$, $P_{B2}$, $P_{B3}$ are directly supplied to the respective hydraulic actuators $A_{C1}$, $A_{C2}$, $A_{B1}$, $A_{B2}$, $A_{B3}$. To provide the line pressure PL, an oil pressure generated from a mechanical oil pump 28 (see FIG. 1) rotated/driven by the engine 30, which serves as the original pressure, is regulated by, for example, a relief type regulating valve (not shown), to a level (line pressure PL) commensurate with the engine load and the like represented by the accelerator pedal travel or throttle opening.

The linear solenoid valves SL1-SL5, which basically have the same construction, are individually and independently energized or deenergized by the electronic control device 100. As a result, the oil pressures applied to the respective hydraulic actuators $A_{C1}$, $A_{C2}$, $A_{B1}$, $A_{B2}$, $A_{B3}$ are independently regulated or controlled, so that the respective engaging pressures $P_{C1}$, $P_{C2}$, $P_{B1}$, $P_{B2}$, $P_{B3}$ of the clutches C1, C2 and brakes B1-B3 are controlled. Thus, the automatic transmission 10 is placed in a selected one of the gear positions, through engagement of predetermined ones of the engaging devices (i.e., clutches and brakes) as indicated in the operation table of FIG. 2, for example. In the shift control of the automatic transmission 10, so-called clutch-to-clutch shift is carried out in which the release and engagement of the clutch C and/or brake B involved in the shift are controlled at the same time. Upon upshift from the 3rd speed to the 4th speed, for example, the brake B3 is released and the clutch C2 is engaged at the same time, such that the oil pressure in the brake B3 that is being released and the oil pressure in the clutch C2 that is being engaged are appropriately controlled so as to suppress or prevent shift shock.

Figure 5:
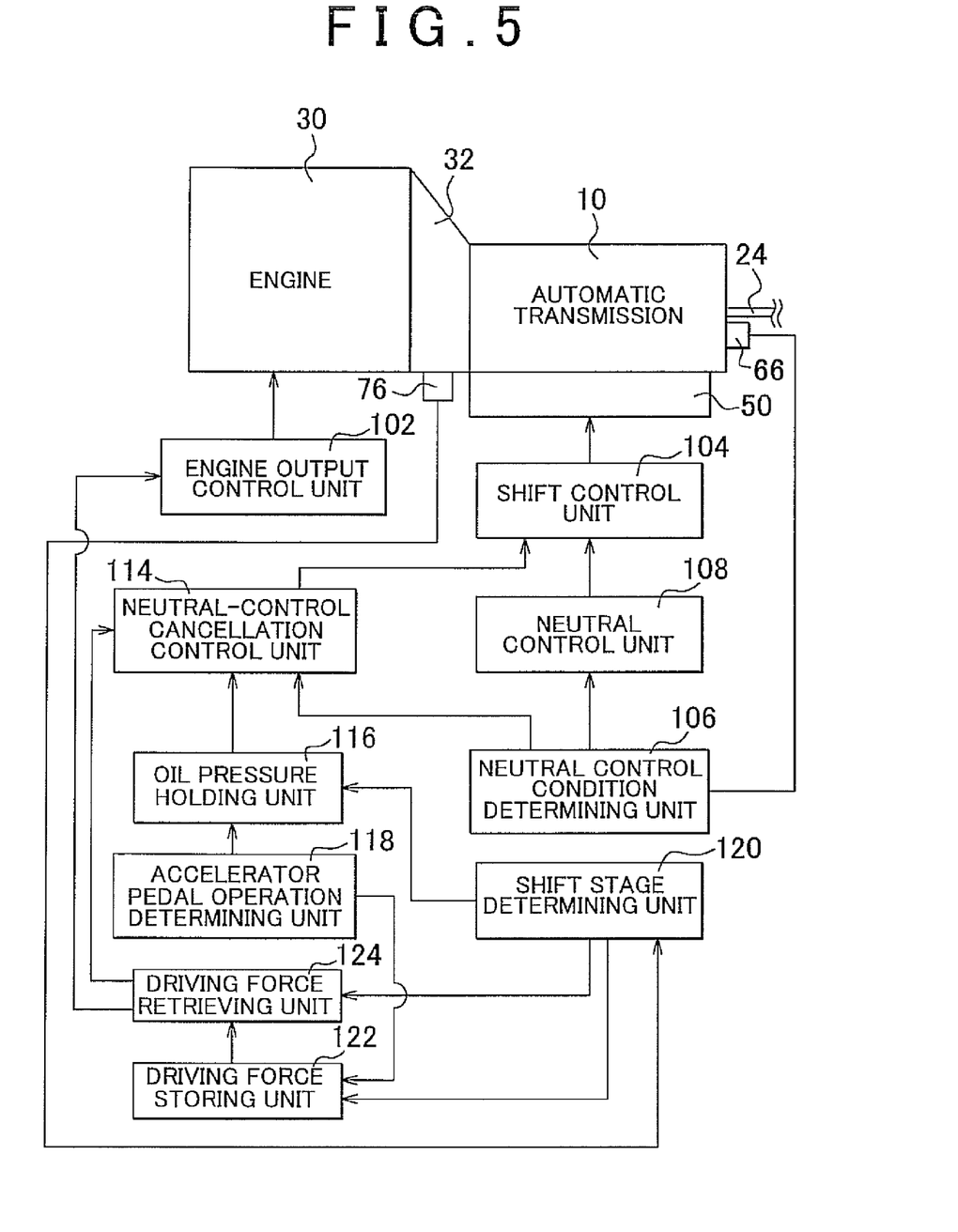
FIG. 5 is a functional block diagram illustrating a principal part of control functions performed by an electronic control device according to the embodiment of the invention.

FIG. 5 is a functional block diagram explaining a principal part of control functions performed by the electronic control device 100. In FIG. 5, an engine output control unit 102 performs output control of the engine 30 by controlling the opening and closing of the electronic throttle valve by means of the throttle actuator, and also controlling a fuel injection device for control of fuel injection, an ignition device, such as an ignitor, for control of the ignition timing, and the like. For example, the engine output control unit 102 drives the throttle actuator according to the accelerator pedal travel signal Acc, based on data stored in advance, so as to perform throttle control under which the throttle opening $\theta_{TH}$ increases as the accelerator pedal travel Acc increases.

Figure 6:
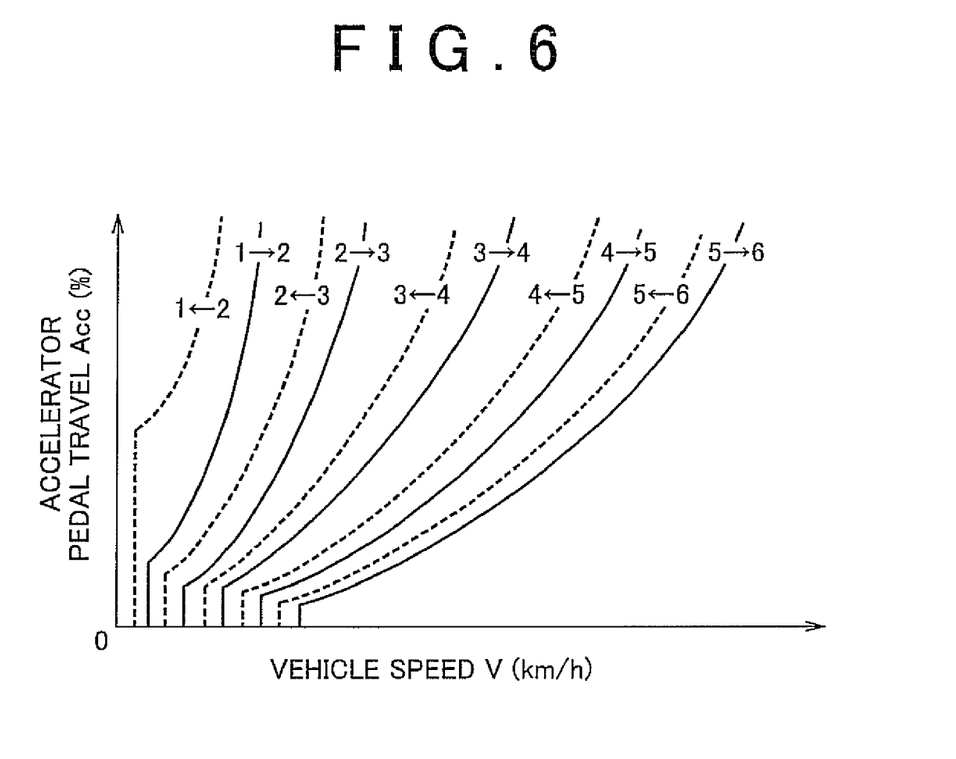
FIG. 6 is a shift diagram showing a pre-stored relationship using the vehicle speed and the accelerator pedal travel as variables according to the embodiment of the invention, according to which it is determined whether the automatic transmission should be shifted up or down based on the actual vehicle speed and accelerator pedal travel.

A shift control unit 104 determines whether the automatic transmission 10 should be shifted up or shifted down, based on a pre-stored map or shift diagram using the vehicle speed V and the accelerator pedal travel (depression amount) Acc as shown in FIG. 6, for example, and the actual vehicle speed V and the actual accelerator pedal travel Acc. The shift control unit 104 determines a gear position or speed to which the automatic transmission 10 should be shifted, and executes automatic shift control of the automatic transmission 10 so as to establish the determined gear position or speed. Upon execution of the automatic shift control, the shift control unit 104 generates a command(s) (i.e., shift output(s) or hydraulic pressure command(s)) for engaging and/or releasing one or more hydraulic friction device(s) involved in the shift of the automatic transmission 10, to the hydraulic control circuit 50, so as to achieve the gear position or speed according to the operation table as shown in FIG. 2, for example.

The hydraulic control circuit 50 operates the linear solenoid valves SL1-SL5 in the hydraulic control circuit 50 according to the above-mentioned commands, so as to effect shifting of the automatic transmission 10, thereby to operate one or more of the hydraulic actuators $A_{C1}$, $A_{C2}$, $A_{B1}$, $A_{B2}$, $A_{B3}$ of the hydraulic friction devices involved in the shifting.

In the shift diagram of FIG. 6, the solid lines are shift lines (upshift lines) based on which upshifting is determined, and the broken lines are shift lines (downshift lines) based on which downshifting is determined. Where the actual accelerator pedal travel Acc (%) is a given value, the shift lines in the shift diagram of FIG. 6 are used for determining whether the actual vehicle speed V on a horizontal line indicating the given value Acc (%) has crossed any one of the shift lines, namely, whether the actual vehicle speed V become higher or lower than a value VS at a shift point on the shift line at which shifting should be carried out. In the shift diagram of FIG. 6, values VS, or shift-point vehicle speeds, corresponding to respective values of the varying actual accelerator pedal travel Acc (%) are set on each of the shift lines, and each shift line of FIG. 6 is stored in advance as a collection of the shift-point vehicle speeds.

A neutral control condition determining unit 106 determines whether a certain neutral control condition is satisfied when the shift lever 72 is placed in one of the running positions. The neutral control condition may be that the vehicle is at rest, and the accelerator pedal 52 is not depressed, while the foot brake pedal 68 is depressed, for example. More specifically, the neutral control condition determining unit 106 determines that the neutral control condition is satisfied, for example, when the lever position $P_{SH}$ is the "D" position, the vehicle speed V is equal to or lower than a predetermined stop determination value, and the brake switch 70 is in the ON state $B_{ON}$, which indicates that the foot brake pedal 68 is depressed.

The neutral control condition determining unit 106 also serves as a neutral control cancellation determining unit that determines whether the above-mentioned neutral condition is satisfied during neutral control exercised by a neutral control unit 108 (which will be described later), so as to sequentially determine whether the neutral control should be cancelled (terminated). More specifically, the neutral control condition determining unit 106 determines that cancellation of the neutral control should be started when the brake switch 70 goes out of the ON state $B_{ON}$, namely, the foot brake pedal 68 is released, during neutral control.

When the neutral control condition determining unit 106 determines that the neutral control condition is satisfied while the shift lever 72 is in the "D" position, for example, the neutral control unit 108 executes neutral control by generating a neutral command that brings the clutch C1 as an engaging device for establishing the first-speed gear position into a slipping state or release state, to the shift control unit 104, so that the power transmission path including the automatic transmission 10 is brought into a power transmission restricted condition or a power transmission interrupted condition. In response to the neutral command, the shift control unit 104 generates a control signal for reducing the engaging pressure of the clutch C1 to the hydraulic control circuit 50, according to a certain pattern that is predetermined so as to bring the clutch C1 into a slipping state or release state. As a result, the power transmission in the automatic transmission 10 is restricted or interrupted (released), so that the torque converter 32 rotates substantially as a single unit, and the idling load of the engine 30 is reduced, thus assuring improved fuel efficiency, reduction in noise and vibrations, and improved riding comfort.

Under the neutral control as described above, the clutch C1 is substantially released, more specifically, is brought into a slightly slipping condition in which the clutch C1 is about to be engaged, for example, so that the power transmission path in the automatic transmission 10 is substantially placed in a cut-off or release condition, while being placed in a start standby condition in which the vehicle is ready to start immediately upon switching from half-engagement to engagement of the clutch C1.

When the neutral control condition determining unit 106 determines, during neutral control, that cancellation of the neutral control should be started, a neutral-control cancellation control unit 114 generates a neutral control cancellation command for increasing the torque transmission capacity of the clutch C1 as an engaging device to be engaged to establish the first-speed gear position and thus engaging the clutch C1, to the shift control unit 104, so that power can be transmitted through the power transmission path including the automatic transmission 10. In this embodiment, the clutch C1 corresponds to the engaging device of the invention.

After the neutral-control cancellation control unit 114 generates the neutral control cancellation command, the driver depresses the accelerator pedal 52 when appropriate. At this time, the neutral-control cancellation control unit 114 executes oil pressure correction for increasing the engaging pressure $P_{C1}$ of the clutch C1, according to the amount of depression of the accelerator pedal 52, or the accelerator pedal travel Acc, so as to immediately generate driving force. While the driver depresses the accelerator pedal 52 at various points in time, the oil pressure correction executed from the time when the accelerator pedal 52 is depressed by the driver is uniformly set according to the accelerator pedal travel Acc; therefore, shock may occur depending on the time at which the accelerator pedal 52 is depressed.

More specifically, while the oil pressure control of the engaging pressure $P_{C1}$ of the clutch C1 is executed upon cancellation of the neutral control, the oil pressure correction is started with an engaged state of the clutch C1 and a shift stage α in the process of shifting the automatic transmission 10 being different depending on the time at which the accelerator pedal 52 is depressed. For example, if the accelerator pedal 52 is depressed immediately after the neutral-control cancellation process is started, the clutch C1 is in the initial stage of engagement, and the oil pressure correction is started from a condition where the torque transmission capacity of the clutch C1 is substantially equal to zero. On the other hand, if the accelerator pedal 52 is depressed after a certain period of time has elapsed from start of the neutral-control cancellation process, the oil pressure correction is started from a condition where the clutch C1 has a certain torque transmission capacity.

If the oil pressure is corrected uniformly or in the same manner according to the accelerator pedal travel Acc, even where the engaged state of the clutch C1 and the shift stage α of the automatic transmission 10 at the time of start of the neutral-control cancellation process are different, the control stability may deteriorate, and shock may occur. In this embodiment, on the other hand, when the accelerator pedal 52 is depressed during cancellation of the neutral control, i.e., during increase of the torque transmission capacity of the clutch C1, an oil pressure holding unit 116 holds the engaging pressure $P_{C1}$ of the clutch C1 at a constant pressure level only for a given period of time, rather than the above-described oil pressure correction, so as to make the engaged state of the clutch C1 and the shift stage α of the automatic transmission 10 stable or constant. In the following, the oil pressure holding unit 116 as the essence of the present invention will be mainly explained.

Referring back to FIG. 5, an accelerator pedal operation determining unit 118 determines a point in time at which the accelerator pedal 52 is depressed during execution of the neutral-control cancellation control, based on the accelerator pedal travel signal of the accelerator pedal position sensor 54 that detects the amount of operation (or accelerator pedal travel Acc) of the accelerator pedal 52.

A shift stage determining unit 120 detects the engaged state of the clutch C1, and determines whether the automatic transmission 10 is in the initial stage of shifting or the final stage of shifting, or whether the automatic transmission 10 has reached a predetermined shift stage α that is set in advance, based on the detected engaged state of the clutch C1. Since the engaged state of the clutch C1 is equivalent to a condition of shifting of the automatic transmission 10 to the first-speed gear position, the shift stage α in the process of shifting the automatic transmission 10 may be determined based on the engaged state of the clutch C1.

The shift stage determining unit 120 determines the engaged state of the clutch C1, based on the turbine racing speed $\Delta N_T$ of the torque converter 32. The turbine racing speed $\Delta N_T$ is defined as a difference in rotational speed, between the turbine speed $N_T$, i.e., the rotational speed $N_{IN}$ of the input shaft 22 that serves as the turbine shaft, and the rotational speed $N_{S3}$ of the rotary member (sun gear S3 of FIG. 1 in this embodiment) located on one side of the clutch C1 closer to the driving wheels (i.e., on the downstream side of the clutch C1 in the direction of power transmission). Namely, the turbine racing speed $\Delta N_T$ is defined as a difference in rotational speed, between the turbine speed $N_T$ and the rotational speed of the rotary member coupled to the turbine shaft (input shaft 22) via the clutch C1. Here, the turbine speed $N_T$ is directly detected or measured by the turbine speed sensor 76. The rotational speed $N_{S3}$ of the rotary member on the driving-wheel side of the clutch C1 is calculated as a product ($=N_{OUT} \times \rho_{1ST}$) of the rotational speed $N_{OUT}$ of the output rotary member 24 of the automatic transmission 10 detected by the vehicle speed sensor 66, and the gear ratio $\rho_{1ST}$ of the first-speed gear position of the automatic transmission 10. Accordingly, the turbine racing speed $\Delta N_T (=N_T - N_{S3})$ is calculated at appropriate times, using the results of detection of the turbine speed $N_T$ and the rotational speed $N_{OUT}$ of the output rotary member 24. Then, the shift stage α of the automatic transmission 10 is determined based on the turbine racing speed $\Delta N_T$.

For example, in the initial stage of shifting of the automatic transmission 10, which comes immediately after the brake pedal is released (brake-off operation), the vehicle speed V is equal to or substantially equal to zero, and therefore, the rotational speed $N_{OUT}$ of the output rotary member 24 is equal to or substantially equal to zero. As a result, $N_{S3}$ is equal to or substantially equal to zero, and the turbine racing speed $\Delta N_T$ is equal to or substantially equal to the turbine speed $N_T$. As is understood from the above description, the shift stage determining unit 120 determines that the automatic transmission 10 is in the initial stage of shifting when the turbine racing speed $\Delta N_T$ is substantially equal to the turbine speed $N_T$ (i.e., when a difference between the turbine racing speed $\Delta N_T$ and the turbine speed $N_T$ is equal to or smaller than a predetermined rotational speed).

In the final stage of shifting of the automatic transmission 10, the torque transmission capacity of the clutch C1 becomes large, and therefore the turbine speed $N_T$ becomes substantially equal to the rotational speed $N_{S3}$ of the rotary member (sun gear S3) coupled to the turbine shaft (input shaft 22) via the clutch C1. As a result, the turbine racing speed $\Delta N_T$ is reduced to be substantially equal to zero. As is understood from the above description, the shift stage determining unit 120 determines that the automatic transmission 10 is in the final stage of shifting when the turbine racing speed $\Delta N_T$ is equal to or lower than a preset rotational speed, for example.

Similarly, the shift stage determining unit 120 determines that the automatic transmission 10 has reached the predetermined shift stage α when the turbine racing speed $\Delta N_T$ detected becomes equal to a predetermined value. Since the engaged state of the clutch C1 changes according to the turbine racing speed $\Delta N_T$, the shift stage α of the automatic transmission 10 can be similarly determined based on the turbine racing speed $\Delta N_T$.

The oil pressure holding unit 116 executes control for holding the engaging pressure $P_{C1}$ of the clutch C1 at a constant pressure level only for a given period of time $\Delta t$, when the accelerator pedal operation determining unit 118 determines that the accelerator pedal 52 is depressed during neutral-control cancellation control, and the shift stage determining unit 120 determines that the shift stage α of the automatic transmission 10 is not the initial stage of shifting nor the final stage of shifting.

When depression of the accelerator pedal 52 is detected, the oil pressure holding unit 116 generates a command for holding the oil pressure at the engaging pressure $P_{C1}$ reached when the depression of the accelerator pedal is started for a given period of time $\Delta t$, to the shift control unit 104, via the neutral-control cancellation control unit 114. By holding the engaging pressure $P_{C1}$ constant only for the given period of time $\Delta t$, the engaged state of the clutch 1 and the shift stage α of the automatic transmission 10 are made constant or consistent irrespective of the time at which the accelerator pedal was depressed by the driver, thus assuring improved stability in control.

More specifically, the oil pressure holding unit 116 holds the engaging pressure $P_{C1}$ constant until the shift stage α of the automatic transmission 10 becomes equal to a preset target shift stage α1. Here, the target shift stage α1 is empirically set in advance, and set to a condition where the clutch C1 has a predetermined torque transmission capacity. Thus, the engaging pressure $P_{C1}$ of the clutch C1 is held constant until the automatic transmission 10 reaches the target shift stage α1, irrespective of the timing of depression of the accelerator pedal 52. It is determined whether the automatic transmission 10 has reached the target shift stage α1, based on a determination as to whether the turbine racing speed $\Delta N_T$ has reached a predetermined rotational speed corresponding to the target shift stage α1.

The above-mentioned given period of time Δt for which the engaging pressure $P_{C1}$ is held constant is a period between a point in time at which depression of the accelerator pedal 52 is started, and a point in time at which the shift stage α becomes equal to the preset target shift stage α1; therefore, the given period of time Δt varies depending on the timing of depression of the accelerator pedal, the level of the constant pressure, etc. For example, if the accelerator pedal 52 is depressed soon after cancellation of the neutral control, it takes a relatively long time until the shift stage α of the automatic transmission 10 becomes equal to the target shift stage α1, and therefore, the period of time Δt for which the engaging pressure $P_{C1}$ is held constant is set to a relatively long time. If, on the other hand, the accelerator pedal 52 is depressed at a later point in time after cancellation of the neutral control, the shift stage α of the automatic transmission 10 has advanced to some extent, and therefore, the period of time Δt is set to a relatively short time.

Then, if the shift stage α of the automatic transmission 10 reaches the target shift stage α1, the neutral-control cancellation control unit 114 restarts oil pressure control of the engaging pressure $P_{C1}$ of the clutch C1.

Figure 7:
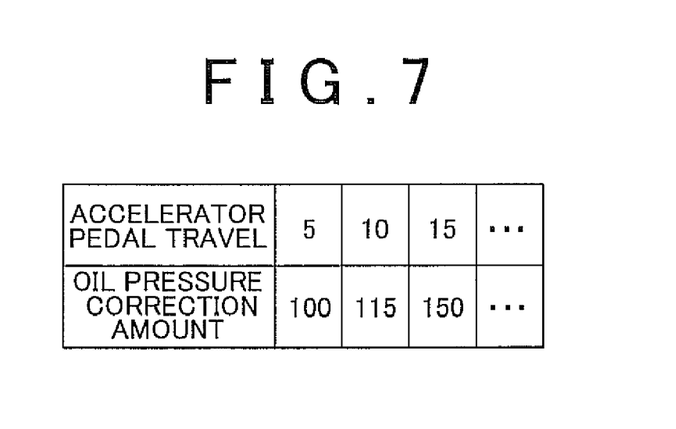
FIG. 7 is a view showing the relationship between the accelerator pedal travel and the oil pressure correction amount according to the embodiment of the invention.

As described above, the engaging pressure $P_{C1}$ of the clutch C1 is held constant at the time when the accelerator pedal 52 is depressed, and the oil pressure correction of the engaging pressure $P_{C1}$ is resumed or restarted when the shift stage α of the automatic transmission 10 becomes equal to the target shift stage α1. If, however, the engaging pressure $P_{C1}$ is determined based on the amount of operation of the accelerator pedal 52, or the accelerator pedal travel Acc, detected when the target shift stage α1 is reached, there may arise a difference between a driving condition intended by the driver and the actual driving condition. To prevent this situation, a driving force storing unit 122 stores driving force that is requested by the driver since start of depression of the accelerator pedal 52, and a driving force retrieving unit 124 retrieves the driver-requested driving force stored in the driving force storing unit 122, and controls the engaging pressure $P_{C1}$ of the clutch C1 based on the driver-requested driving force thus retrieved. The relationship between the accelerator pedal travel Acc and the oil pressure correction amount is set in advance, as shown in FIG. 7 by way of example, and the engaging pressure $P_{C1}$ is corrected based on the relationship as described above. As shown in FIG. 7, the oil pressure correction amount is set so as to increase as the accelerator pedal travel Acc increases.

The driving force storing unit 122 stores the driving force requested by the driver, based on the accelerator pedal travel Acc representing the amount of operation of the accelerator pedal 52, from the time when the accelerator pedal 52 starts being depressed to the time when the shift stage α of the automatic transmission 10 becomes equal to the target shift stage α1. Then, when the shift stage α becomes equal to the target shift stage α1, the engine output and the engaging pressure $P_{C1}$ are controlled based on the driver-requested driving force (accelerator pedal travel Acc) stored in the driving force storing unit 122. Accordingly, the requested driving force desired by the driver is produced without being varied. In this case, the requested driving force is generated after the engaging pressure $P_{C1}$ is held at a constant level for a given period of time Δt, resulting in a delay in generation of the driving force. However, since the actual period of time Δt for which the engaging pressure $P_{C1}$ is held constant is an extremely short time, the driver will not feel uncomfortable about the delay.

Figure 8:
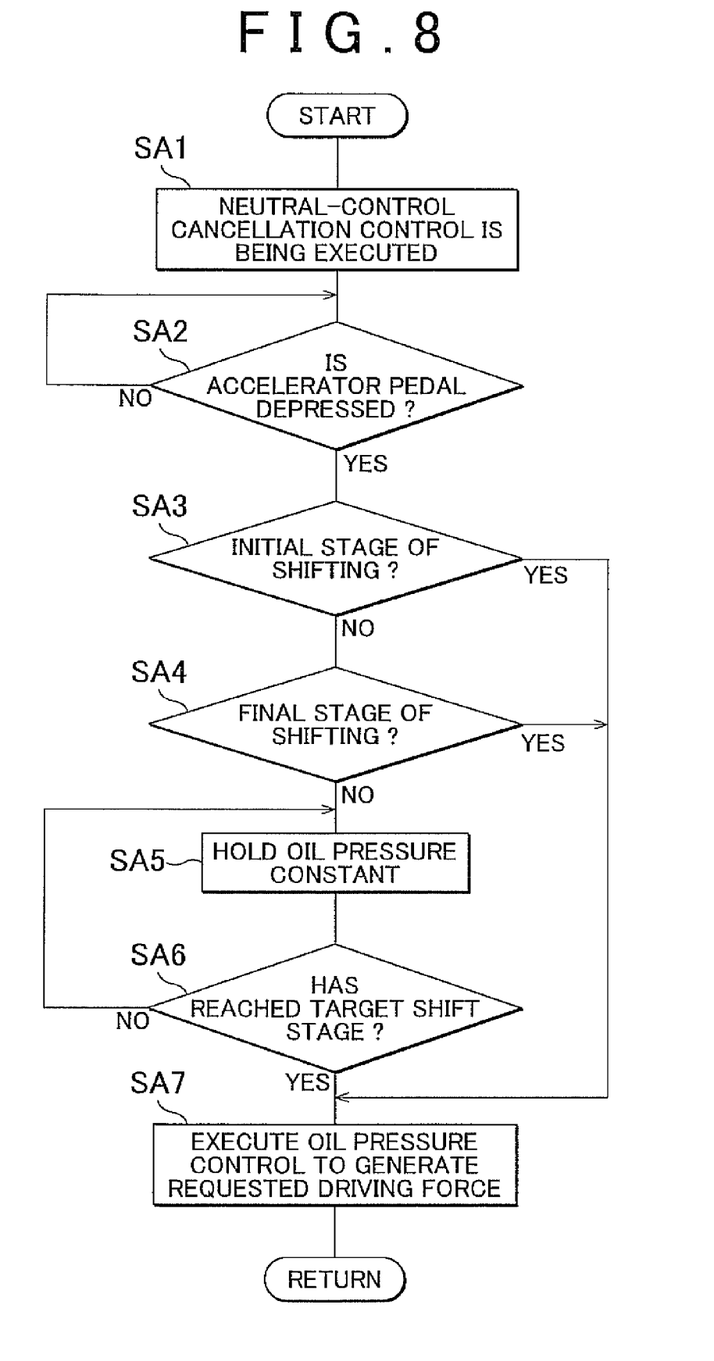
FIG. 8 is a flowchart explaining a principal part of control operation of the electronic control device according to the embodiment of the invention, namely, a control operation performed when the accelerator pedal is depressed during neutral-control cancellation control so as to reduce shock regardless of the timing of depression of the accelerator pedal.

FIG. 8 is a flowchart illustrating a principal part of control operation of the electronic control device 100, more specifically, a control operation performed when the accelerator pedal 52 is depressed during execution of neutral-control cancellation control, for reducing shock irrespective of variations in the timing of depression of the accelerator pedal 52. The control operation or process of FIG. 8, for example, is repeatedly executed at extremely short intervals of several milliseconds to several dozens of milliseconds.

Initially, in step SA1 corresponding to the neutral control condition determining unit 106, the neutral-control cancellation control is executed when the brake pedal 68 is released, i.e., operated to the OFF position. Then, in step SA2 corresponding to the accelerator pedal operation determining unit 118, it is determined whether the accelerator pedal 52 is depressed, i.e., operated to the ON position. If a negative decision (NO) is obtained in step SA2, the control returns to step SA2, and this step is repeatedly executed until the accelerator pedal 52 is operated to the ON position. If the accelerator pedal 52 is operated to the ON position and an affirmative decision (YES) is obtained in step SA2, step SA3 corresponding to the shift stage determining unit 120 is executed to determine whether the shift stage of the automatic transmission 10 is the initial stage of shifting. If an affirmative decision (YES) is obtained in step SA3, the engine output control and the oil pressure control (i.e., oil pressure correction) of the engaging pressure $P_{C1}$ based on the condition of the automatic transmission 10 in the initial stage of shifting are carried out in step SA7. If a negative decision (NO) is obtained in step SA3, on the other hand, it is determined in step SA4 corresponding to the shift stage determining unit 120 whether the shift stage of the automatic transmission 10 is the final stage of shifting. If an affirmative decision (YES) is obtained in step SA4, which means that the shift stage in the process of shifting the automatic transmission 10 has advanced sufficiently, the engine output control and the oil pressure control (i.e., oil pressure correction) of the engaging pressure $P_{C1}$ based on the condition in the final stage of shifting are carried out in step SA7.

If a negative decision (NO) is obtained in step SA4, on the other hand, the engaging pressure $P_{C1}$ of the clutch C1 is held at a constant pressure level in step SA5 corresponding to the oil pressure holding unit 116. The constant pressure level is set to the level of the engaging pressure $P_{C1}$ which is set when the accelerator pedal 52 is depressed. Then, in step SA6 corresponding to the shift stage determining unit 120, it is determined whether the shift stage α of the automatic transmission 10 has reached the preset target shift stage α1. If a negative decision (NO) is obtained in step SA6, the control returns to step SA5 to continue to hold the engaging pressure $P_{C1}$ constant. Thus, the engaging pressure $P_{C1}$ is held constant until the shift stage α becomes equal to the target shift stage α1. Then, if an affirmative decision (YES) is obtained in step SA6, namely, if the shift stage α reaches the target shift stage α1, step SA7 corresponding to the driving force storing unit 122 and the driving force retrieving unit 124 is executed to retrieve the driver-requested driving force requested by the driver since start of depression of the accelerator pedal. As a result, the requested driving force intended by the driver is produced.

Figure 9:
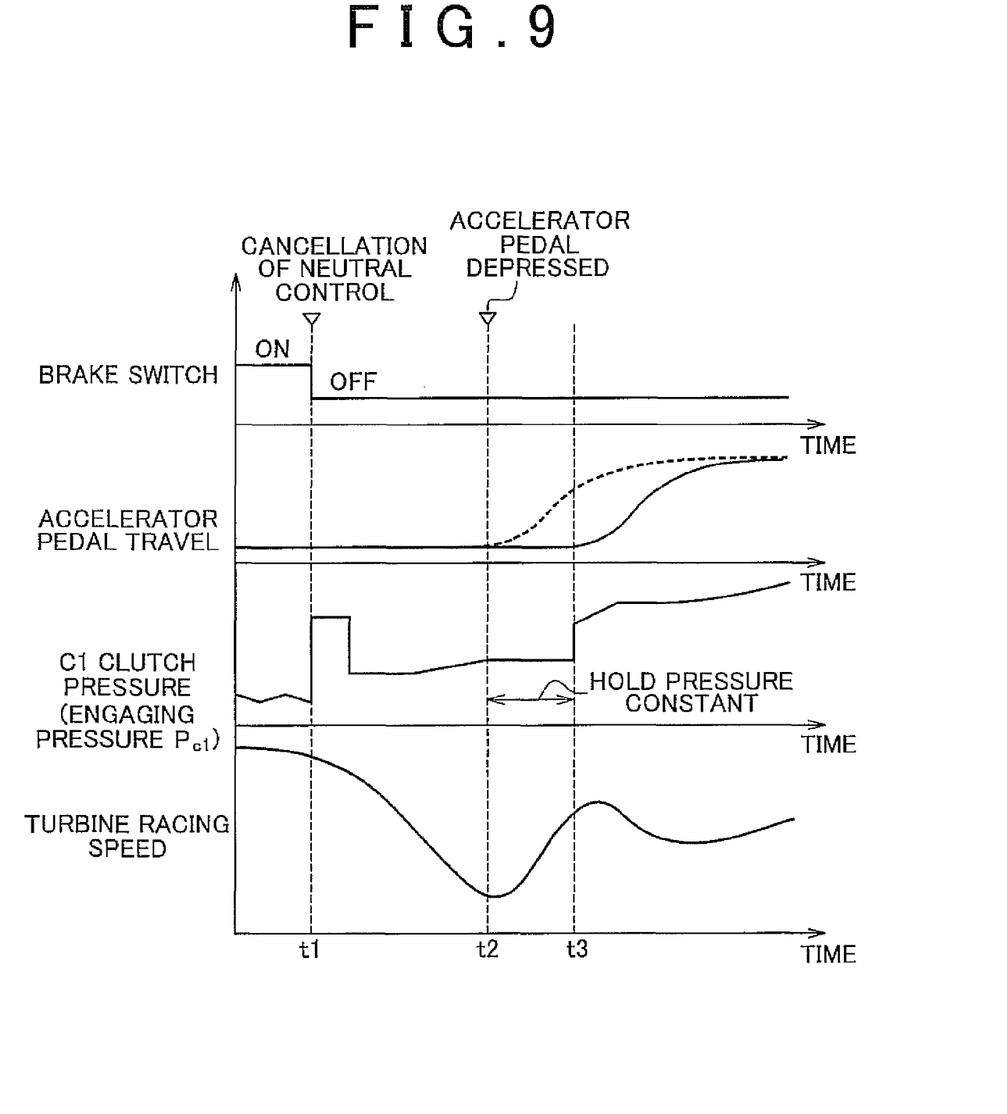
FIG. 9 is a time chart explaining the control operation performed according to the embodiment of the invention when the accelerator pedal is depressed during neutral-control cancellation control so as to reduce shock regardless of the timing of depression of the accelerator pedal.

FIG. 9 is a time chart useful for explaining the control operation performed when the accelerator pedal 52 is depressed during execution of neutral-control cancellation control, for reducing shock stably irrespective of variations in the timing of depression of the accelerator pedal 52.

If the brake pedal 68 is released or operated to the OFF position, namely, if the brake switch is turned off, at time t1 in FIG. 9 during execution of the neutral control, the neutral-control cancellation control unit 114 initiates its neutral-control cancellation control. More specifically, at time t1, the engaging pressure $P_{C1}$ as a command oil pressure applied to the clutch C1 as an engaging device to be engaged to establish the first-speed gear position is rapidly raised to a high level as indicated by a solid line in FIG. 9, so that so-called fast fill for filling a clearance of the clutch C1 is carried out. Then, in a period between time t1 and time t2, the engaging pressure $P_{C1}$ is lowered from the high level achieved by the fast fill and held constant, and is then gradually increased. With the engaging pressure $P_{C1}$ thus controlled, the engagement of the clutch C1 (i.e., shifting of the automatic transmission) proceeds, and the torque transmission capacity of the clutch C1 increases as the engagement of the clutch C1 proceeds, resulting in a reduction in the turbine racing speed $\Delta N_T$. If the accelerator pedal 52 is depressed or operated to the ON position at time t2 as indicated by a broken line in FIG. 9, the engaging pressure $P_{C1}$ of the clutch C1, which would otherwise gradually increase, is held at a constant pressure level equal to the level achieved at time t2, by the oil pressure holding unit 116 in a period between time t2 and time t3. As a result, the engaged state of the clutch C1 and the shift stage $\alpha$ of the automatic transmission 10 are made constant or consistent at time t3, irrespective of the time at which the accelerator pedal 52 was depressed. In a period between time t2 and time t3, the turbine racing speed $\Delta N_T$ increases in accordance with depression of the accelerator pedal.

Then, if the engaged state of the clutch C1 reaches a given engaged state set in advance and the shift stage $\alpha$ of the automatic transmission 10 reaches the target shift stage $\alpha 1$ at time t3, the driver-requested driving force detected at time t2 or later and stored in the driving force storing unit 122 is retrieved. Then, the engaging pressure $P_{C1}$ of the clutch C1 to be achieved after time t3 is determined, based on the driver-requested driving force stored in the driving force storing unit 122, and the engaging pressure $P_{C1}$ is controlled to the thus determined oil pressure. While the engaging pressure $P_{C1}$ of the clutch C1 is raised stepwise at time t3 as indicated by a solid line in FIG. 9, the engaging pressure $P_{C1}$ may change as appropriate in accordance with the driver-requested driving force. As described above, since the driver-requested driving force is generated at time t3, the actual requested driving force is prevented from deviating from the requested driving force intended by the driver.

According to this embodiment, when the accelerator pedal 52 is depressed while the torque transmission capacity of the clutch C1 as the engaging device is being increased after cancellation of the neutral control, the engaging pressure $P_{C1}$ of the clutch C1 is held at a constant pressure level for the given period of time $\Delta t$, so that the engaged state of the clutch C1 and the shift stage $\alpha$ of the automatic transmission 10 can be made constant or consistent irrespective of the timing of depression of the accelerator pedal 52. Accordingly, the subsequent hydraulic control (i.e., oil pressure correction) of the clutch C1 can be carried out based on substantially the same engaged state and shift stage $\alpha$, irrespective of the timing of depression of the accelerator pedal 52; therefore the control stability is improved, and shock that would occur upon cancellation of the neutral control can be stably reduced.

Also, according to this embodiment, the driver-requested driving force based on the amount of depression of the accelerator pedal 52 detected since start of the depression of the accelerator pedal is stored, and the requested driving force stored in the driving force storing unit 122 is retrieved after the engaging pressure $P_{C1}$ of the clutch C1 is held constant by the oil pressure holding unit 116. Therefore, the driving force substantially equal to the driver-requested driving force is generated after the engaging pressure $P_{C1}$ is held constant for the given period of time $\Delta t$. Accordingly, the actual driving force is prevented from deviating from the driving force intended or requested by the driver, and the driver will not feel uncomfortable about such deviation from the requested driving force.

Also, according to this embodiment, the given period of time $\Delta t$ for which the engaging pressure $P_{C1}$ is held constant is a period of time from time when the accelerator pedal starts being depressed, to the time when the turbine racing speed $\Delta N_T$ becomes equal to the preset or predetermined value. Thus, the start and end points of the given period of time $\Delta t$ for which the engaging pressure $P_{C1}$ is held constant can be easily determined. Also, the time when the engaged state of the clutch C1 and the shift stage have reached preset engaged state and shift stage can be determined based on the turbine racing speed $\Delta N_T$.

Also, according to this embodiment, the constant pressure at which the engaging pressure $P_{C1}$ of the clutch C1 is held is the oil pressure reached when the accelerator pedal 52 is depressed. Thus, the engaging pressure $P_{C1}$ is held constant at the oil pressure at the time of depression of the accelerator pedal 52. With the engaging pressure $P_{C1}$ thus controlled, the engagement of the clutch C1 proceeds so that the clutch C1 can be brought into the preset engaged state.

Also, according to this embodiment, the oil pressure correction amount of the clutch C1 increases as the accelerator pedal travel Acc increases; therefore, the oil pressure commensurate with the driver-requested driving force can be appropriately generated.

Preferably, the predetermined condition under which the neutral control is cancelled is equivalent to the operation to switch the foot brake from ON to OFF (i.e., release the foot brake) during neutral control. In this case, cancellation of the neutral control is determined when the above operation is performed, and the control for increasing the torque transmission capacity of the engaging device is started upon determination of the cancellation of the neutral control.

Preferably, the turbine racing speed is equivalent to a difference in rotational speed between the rotational speed of the turbine shaft and the rotational speed of the driving-wheel side rotary shaft that is coupled to the turbine shaft via the engaging device. In this case, the engaged state of the engaging device and the shift stage in the process of shifting the automatic transmission can be determined based on the turbine racing speed calculated in the above manner.

While one embodiment of the invention has been described in detail with reference to the drawings, the present invention may be otherwise embodied.

For example, while the oil pressure held constant by the oil pressure holding unit 116 is set to the oil pressure reached at the time of depression of the accelerator pedal in the illustrated embodiment, the oil pressure is not necessarily limited to this pressure, but may be a constant pressure that is set in advance by experiment, or a constant pressure that is set according to the shift stage $\alpha$. For example, the constant pressure may be set at a high level when the shift stage $\alpha$ is an early or initial stage, so that the given time required for the shift stage $\alpha$ to reach the target shift stage $\alpha 1$ is shortened.

Also, while the automatic transmission 10 of the illustrated embodiment is capable of shifting among forward-drive six speeds and reverse-drive one speed, the number of speeds (or gear positions) and internal structure of the automatic transmission are not limited to those of the automatic transmission 10 as described above. Namely, the invention can be applied to any type of automatic transmission provided that the transmission is operable under neutral control, and a certain engaging device is arranged to be engaged when the neutral control is cancelled. Also, the invention can be applied to continuously variable transmissions, such as a belt-and-pulley type continuously variable transmission (CVT). In the case of the belt-and-pulley type continuously variable transmission, the invention is applied to an engaging device that controls a forward-drive/reverse-drive switching device.

While the clutch C1 serves as an engaging device to be controlled according to the invention in the illustrated embodiment, the clutch C1 does not necessarily serves as the engaging device, but the engaging device of the invention may be suitably changed according to the internal construction of the automatic transmission.

In the illustrated embodiment, when the turbine racing speed $\Delta N_T$ is calculated, the rotational speed of the rotary shaft on the driving-wheel side of the clutch C1 is calculated, based on the rotational speed $N_{OUT}$ of the output shaft and the gear ratio. However, the rotational speed of the rotary shaft on the driving-wheel side of the clutch C1 may be directly detected or measured by a rotational speed sensor provided on the driving-wheel side of the clutch C1.

The relationship between the accelerator pedal travel Acc and the oil pressure correction amount as indicated in the illustrated embodiment is a mere example, and may be suitably changed based on, for example, the shape of the vehicle.

It is to be understood that the illustrated embodiment is one embodiment or example of the invention only, and that the invention may be otherwise embodied with various changes, modifications and/or improvements, based on the knowledge of those skilled in the art.

What is claimed is:

1. A control device of a vehicular automatic transmission, comprising:
    a neutral control unit that brings an engaging device provided in a power transmission path between an engine and driving wheels into a slipping state or a release state when a certain neutral control condition is satisfied while a shift lever is placed in a running position, so as to restrict power transmission through the power transmission path and reduce an idling load of the engine;
    a neutral-control cancellation control unit that engages the engaging device so as to increase a torque transmission capacity thereof when a certain neutral control cancellation condition is satisfied during neutral control under which the engaging device is in the slipping state or the release state; and
    an oil pressure holding unit that holds an engaging pressure of the engaging device at a constant pressure level for a given period of time, when an accelerator pedal is depressed while the engaging device is engaged so as to increase the torque transmission capacity thereof;
    wherein the given period of time for which the engaging pressure of the engaging device is held at the constant pressure level is a period starting at a point in time at which depression of the accelerator pedal is started.

2. The control device according to claim 1, further comprising:
    a driving force storing unit that stores a driver-requested driving force corresponding to an amount of depression of the accelerator pedal detected upon and after start of depression of the accelerator pedal; and
    a driving force retrieving unit that retrieves the driver-requested driving force stored in the driving force storing unit so that the retrieved driving force is generated after the engaging pressure of the engaging device is held at the constant pressure level by the oil pressure holding unit.

3. The control device according to claim 1, wherein the given period of time for which the engaging pressure of the engaging device is held at the constant pressure level is a period from the point in time at which depression of the accelerator pedal is started to a point in time at which a turbine racing speed becomes equal to a predetermined value.

4. The control device according to claim 1, wherein the constant pressure level of the engaging device is an oil pressure reached at the time of depression of the accelerator pedal.

5. The control device according to claim 1, further comprising an engaging pressure increasing unit that increases the engaging pressure of the engaging device as an accelerator pedal travel increases, after the engaging pressure of the engaging device is held at the constant pressure level.

6. The control device according to claim 1, further comprising a shift stage determining unit that determines a shift stage in the process of shifting the vehicular automatic transmission, wherein
    the oil pressure holding unit holds the engaging pressure of the engaging device at the constant pressure level for a given period of time, when the accelerator pedal is depressed while the engaging device is engaged so as to increase the torque transmission capacity thereof, and the shift stage determining unit determines that the shift stage of the vehicular automatic transmission is within a range between a first shift stage corresponding to an initial stage of shifting immediately after start of the shifting process and a second shift stage corresponding to a final stage of shifting immediately before completion of the shifting process.

7. The control device according to claim 6, wherein the shift stage determining unit determines the shift stage based on the engaged state of the engaging device.

8. The control device according to claim 7, wherein the shift stage determining unit determines the engaged state of the engaging device, based on a difference in rotational speed between a rotational speed of an input shaft of the vehicular automatic transmission and a rotational speed of an output shaft of the vehicular automatic transmission.

9. The control device according to claim 8, wherein the shift stage determining unit determines that the shift stage is the first shift stage when a difference between the difference in rotational speed and the rotational speed of the input shaft is equal to or smaller than a first predetermined rotational speed, and that the shift stage is the second shift stage when the difference in rotational speed is equal to or smaller than a second predetermined rotational speed.

10. A control method of a vehicular automatic transmission, comprising:
    bringing an engaging device provided in a power transmission path between an engine and driving wheels into a slipping state or a release state when a certain neutral control condition is satisfied while a shift lever is placed in a running position;
    engaging the engaging device so as to increase a torque transmission capacity thereof when a certain neutral control cancellation condition is satisfied during neutral control under which the engaging device is in the slipping state or the release state; and
    holding an engaging pressure of the engaging device at a constant pressure level for a given period of time, when an accelerator pedal is depressed while the engaging device is engaged so as to increase the torque transmission capacity thereof;
    wherein the given period of time for which the engaging pressure of the engaging device is held at the constant pressure level is a period starting at a point in time at which depression of the accelerator pedal is started.

11. The control method according to claim 10, further comprising:
storing a driver-requested driving force corresponding to an amount of depression of the accelerator pedal detected upon and after start of depression of the accelerator pedal; and
retrieving the stored driver-requested driving force so that the retrieved driving force is generated after the engaging pressure of the engaging device is held at the constant pressure level.

12. The control method according to claim 10, wherein the given period of time for which the engaging pressure of the engaging device is held at the constant pressure level is a period from the point in time at which depression of the accelerator pedal is started to a point in time at which a turbine racing speed becomes equal to a predetermined value.

13. The control method according to claim 10, wherein the constant pressure level of the engaging device is an oil pressure reached at the time of depression of the accelerator pedal.

14. The control method according to claim 10, further comprising
increasing the engaging pressure of the engaging device as an accelerator pedal travel increases, after the engaging pressure of the engaging device is held at the constant pressure level.

15. The control method according to claim 10, further comprising
determining a shift stage in the process of shifting the vehicular automatic transmission, wherein
the engaging pressure of the engaging device is held at the constant pressure level for a given period of time, when the accelerator pedal is depressed while the engaging device is engaged so as to increase the torque transmission capacity thereof, and it is determined that the shift stage of the vehicular automatic transmission is within a range between a first shift stage corresponding to an initial stage of shifting immediately after start of the shifting process and a second shift stage corresponding to a final stage of shifting immediately before completion of the shifting process.

16. The control method according to claim 15, wherein the shift stage is determined based on the engaged state of the engaging device.

17. The control method according to claim 16, wherein the engaged state of the engaging device is determined based on a difference in rotational speed between a rotational speed of an input shaft of the vehicular automatic transmission and a rotational speed of an output shaft of the vehicular automatic transmission.

18. The control method according to claim 17, wherein it is determined that the shift stage is the first shift stage when a difference between the difference in rotational speed and the rotational speed of the input shaft is equal to or smaller than a first predetermined rotational speed, and that the shift stage is the second shift stage when the difference in rotational speed is equal to or smaller than a second predetermined rotational speed.

19. A control device of a vehicular automatic transmission, comprising:
a neutral control unit that brings an engaging device provided in a power transmission path between an engine and driving wheels into a slipping state or a release state when a certain neutral control condition is satisfied while a shift lever is placed in a running position, so as to restrict power transmission through the power transmission path and reduce an idling load of the engine;
a neutral-control cancellation control unit that engages the engaging device so as to increase a torque transmission capacity thereof when a certain neutral control cancellation condition is satisfied during neutral control under which the engaging device is in the slipping state or the release state;
an oil pressure holding unit that holds an engaging pressure of the engaging device at a constant pressure level for a given period of time, when an accelerator pedal is depressed while the engaging device is engaged so as to increase the torque transmission capacity thereof; and
a shift stage determining unit that determines a shift stage in the process of shifting the vehicular automatic transmission, the shift stage determining unit determines that the shift stage of the vehicular automatic transmission is within a range between a first shift stage corresponding to an initial stage of shifting immediately after start of the shifting process and a second shift stage corresponding to a final stage of shifting immediately before completion of the shifting process;
wherein the given period of time for which the engaging pressure of the engaging device is held at the constant pressure level is a period from a point in time at which depression of the accelerator pedal is started to a point in time at which a turbine racing speed becomes equal to a predetermined value.

* * * * *